United States Patent
Tanaka

(10) Patent No.: US 11,774,268 B2
(45) Date of Patent: Oct. 3, 2023

(54) CONTROL APPARATUS, VEHICLE SYSTEM, AND CONTROL METHOD

(71) Applicant: HONDA MOTOR CO., LTD., Tokyo (JP)

(72) Inventor: Masaki Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 17/026,456

(22) Filed: Sep. 21, 2020

(65) Prior Publication Data

US 2021/0088360 A1 Mar. 25, 2021

(30) Foreign Application Priority Data

Sep. 25, 2019 (JP) .................................. 2019-173979

(51) Int. Cl.
*G01D 5/20* (2006.01)
*G01D 18/00* (2006.01)
(Continued)

(52) U.S. Cl.
CPC .............. *G01D 5/2006* (2013.01); *B60L 3/08* (2013.01); *G01D 18/00* (2013.01); *H02K 29/06* (2013.01)

(58) Field of Classification Search
CPC ........ G01D 5/2006; G01D 5/12; G01D 18/00; G01D 5/24471; G01R 11/00;
(Continued)

(56) References Cited

U.S. PATENT DOCUMENTS

| 2005/0046369 A1* | 3/2005 | Kobayashi | ............ B60L 15/025 318/432 |
| 2011/0127938 A1* | 6/2011 | Kawakami | .............. H02P 23/14 318/400.13 |

(Continued)

FOREIGN PATENT DOCUMENTS

| CN | 102282758 | 12/2011 | |
| CN | 103329426 A * | 9/2013 | ............ B60L 15/025 |

(Continued)

OTHER PUBLICATIONS

Y. Hu, C. Hu, Y. Zhang, Q. Wang and Z. Qian, "Model Predictive Control of Permanent Magnet Synchronous Motor Based on Vector Synthesis," 2019 14th IEEE Conference on Industrial Electronics and Applications (ICIEA), Xi'an, China, 2019, pp. 276-280, doi: 10.1109/ICIEA.2019.8833666. (Year: 2019).*

(Continued)

*Primary Examiner* — Daniel R Miller
*Assistant Examiner* — Eric Sebastian Von Wald
(74) *Attorney, Agent, or Firm* — AMIN, TUROCY & WATSON, LLP

(57) ABSTRACT

A control apparatus includes: a data acquisition part that acquires correction data indicating a content regarding a correction process which corrects an error of an angle at which a rotation angle sensor that measures a rotation angle of a rotor included in an electric motor is attached; a determination part that determines, based on the correction data, whether or not the correction process has been performed; and a control method determination part that determines, in a case where it is determined that the correction process has not been performed, that an inverter which supplies an AC current to the electric motor is controlled under a pulse-width modulation control.

4 Claims, 7 Drawing Sheets

(51) Int. Cl.
H02K 29/06 (2006.01)
B60L 3/08 (2006.01)

(58) Field of Classification Search
CPC ........... G05B 2219/50049; G05B 2219/37506; B60L 3/08; B60L 3/00; B60L 3/003; B60L 3/0038; B60L 3/0061; B60L 3/0023; G06F 11/1048; G11B 20/025; H01K 29/06; H02K 11/21; H02K 11/24; H02K 29/12; H05B 45/325; H05B 45/32; H02M 7/527; H02M 7/525; H02M 7/529; H02J 2310/48; H03M 1/822; H04N 1/40043; H02P 27/085; Y02T 10/64; F16D 2066/003

See application file for complete search history.

(56) References Cited

U.S. PATENT DOCUMENTS

| | | | |
|---|---|---|---|
| 2011/0273125 A1 | 11/2011 | Yamada et al. | |
| 2014/0125264 A1* | 5/2014 | Nakamura | H02P 6/10 318/400.23 |
| 2014/0336878 A1 | 11/2014 | Yanai et al. | |
| 2015/0123580 A1* | 5/2015 | Omata | H02P 29/032 318/400.17 |
| 2019/0074788 A1* | 3/2019 | Yasuda | H02P 23/20 |

FOREIGN PATENT DOCUMENTS

| | | | |
|---|---|---|---|
| CN | 103946673 | 7/2014 | |
| JP | 2003-189700 | 7/2003 | |
| JP | 2007-181400 | 7/2007 | |
| JP | 2009-100548 | 5/2009 | |
| JP | 2019047702 A * | 3/2019 | ............. B60L 1/003 |

OTHER PUBLICATIONS

N. Taran, V. Rallabandi and D. M. Ionel, "WAVED: A Coreless Axial Flux PM Motor for Drive Systems with Constant Power Operation," 2019 IEEE Transportation Electrification Conference and Expo (ITEC), Detroit, MI, USA, 2019, pp. 1-6, doi: 10.1109/ITEC.2019.8790489. (Year: 2019).*

J. Hu, T. Peng, M. Jia, Y. Yang and Y. Guan, "Study on Electromechanical Coupling Characteristics of an Integrated Electric Drive System for Electric Vehicle," in IEEE Access, vol. 7, pp. 166493-166508, 2019, doi: 10.1109/ACCESS.2019.2953310. (Year: 2019).*

Japanese Office Action for Japanese Patent Application No. 2019-173979 dated Jun. 29, 2021.

Chinese Office Action for Chinese Patent Application No. 202010089551.5 dated Apr. 27, 2023.

* cited by examiner

CONTROL APPARATUS, VEHICLE SYSTEM, AND CONTROL METHOD

CROSS-REFERENCE TO RELATED APPLICATION

Priority is claimed on Japanese Patent Application No. 2019-173979, filed on Sep. 25, 2019, the contents of which are incorporated herein by reference.

BACKGROUND

Field of the Invention

The present invention relates to a control apparatus, a vehicle system, and a control method.

Background

In the related art, vehicles using an electric motor as a power source such as, for example, an electric vehicle (EV), a hybrid vehicle (HV), and a fuel cell vehicle (FCV) have been developed.

A one-pulse control and a pulse-width modulation control have been developed as a control method of an inverter that supplies an AC current to an electric motor mounted on the vehicle described above.

For example, an electric vehicle control apparatus according to Japanese Unexamined Patent Application, First Publication No. 2009-100548 has a means for switching a control mode from a synchronous one-pulse control mode to a multiple-pulse control mode when an inverter frequency in the synchronous one-pulse control mode is within a specific frequency band.

SUMMARY

A rotation angle sensor that measures a rotation angle of a rotor is attached to the electric motor described above. It is necessary to ship the vehicle described above after the rotation angle sensor is attached to the electric motor and then a correction process that corrects an error of an attachment angle is performed. The reason for this is as follows.

When the correction process is not performed, the difference between a drive torque of the electric motor in a case where the one-pulse control is performed and a drive torque of the electric motor in a case where the pulse-width modulation control is performed is large. Therefore, when a control method of an inverter is switched, the drive torque of the electric motor suddenly changes, this sudden change of the drive torque may be transmitted to a vehicle body through a spring element such as a motor mount which supports the electric motor with respect to the vehicle body and may vibrate the vehicle body, and the riding comfort of the vehicle may be degraded. Accordingly, a technique that performs a correction process while the vehicle is traveling is desired in preparation for a case where the vehicle is shipped in a state where the correction process is not performed.

However, this correction process can be performed in a case where the pulse-width modulation control is being performed but cannot be performed in a case where the one-pulse control is being performed. Therefore, the electric vehicle control apparatus described above cannot perform the correction process while the vehicle is traveling, and it may not be possible to sufficiently reduce the vibration of the vehicle body due to the sudden change of the drive torque of the electric motor.

An object of an aspect of the present invention is to provide a control apparatus, a vehicle system, and a control method capable of reducing vibration of a vehicle body due to a sudden change of a drive torque of an electric motor.

A control apparatus according to a first aspect of the present invention is a control apparatus including: a data acquisition part that acquires correction data indicating a content regarding a correction process which corrects an error of an angle at which a rotation angle sensor that measures a rotation angle of a rotor included in an electric motor is attached; a determination part that determines, based on the correction data, whether or not the correction process has been performed; and a control method determination part that determines, in a case where it is determined that the correction process has not been performed, that an inverter which supplies an AC current to the electric motor is controlled under a pulse-width modulation control.

A second aspect of the present invention is the control apparatus according to the first aspect, wherein the data acquisition part may acquire the correction data which includes history data indicating whether or not the correction process has been performed, and the determination part may determine that the correction process has not been performed in a case where the history data indicates that the correction process has not been performed.

A third aspect of the present invention is the control apparatus according to the first aspect, wherein the data acquisition part may acquire the correction data which includes error data indicating the error, and the determination part may determine that the correction process has not been performed in a case where the error indicated by the error data exceeds a predetermined threshold value.

A vehicle system according to a fourth aspect of the present invention is a vehicle system including: a data acquisition part that acquires correction data indicating a content regarding a correction process which corrects an error of an angle at which a rotation angle sensor that measures a rotation angle of a rotor included in an electric motor is attached; a determination part that determines, based on the correction data, whether or not the correction process has been performed; and a control method determination part that determines, in a case where it is determined that the correction process has not been performed, that an inverter which supplies an AC current to the electric motor is controlled under a pulse-width modulation control.

A control method according to a fifth aspect of the present invention is a control method including: acquiring correction data indicating a content regarding a correction process which corrects an error of an angle at which a rotation angle sensor that measures a rotation angle of a rotor included in an electric motor is attached; determining, based on the correction data, whether or not the correction process has been performed; and determining, in a case where it is determined that the correction process has not been performed, that an inverter which supplies an AC current to the electric motor is controlled under a pulse-width modulation control.

According to the first to fifth aspects described above, the control apparatus determines that the inverter which supplies an AC current to the electric motor is controlled under the pulse-width modulation control in a case where it is determined that the correction process has not been performed based on the correction data. Thereby, the control apparatus makes the control method of the inverter a control method capable of performing the correction process and performs the correction process, and it is possible to reduce vibration of a vehicle body due to a sudden change of a drive torque of the electric motor.

According to the second aspect described above, the control apparatus determines that the correction process has not been performed in a case where the history data indicates that the correction process has not been performed. Thereby, the control apparatus can further reliably determine that the correction process has not been performed on the basis of the past history.

According to the third aspect described above, the control apparatus determines that the correction process has not been performed in a case where the error indicated by the error data exceeds the predetermined threshold value. Thereby, since the control apparatus can estimate whether or not the correction process has been performed on the basis of the magnitude of the error of the angle at which the rotation angle sensor is attached, it is possible to omit a process of confirming the past history.

DESCRIPTION OF THE EMBODIMENTS

Hereinafter, an embodiment of a control apparatus, a vehicle system, and a control method according to the present invention will be described with reference to the drawings.

Embodiment

Figure 1:
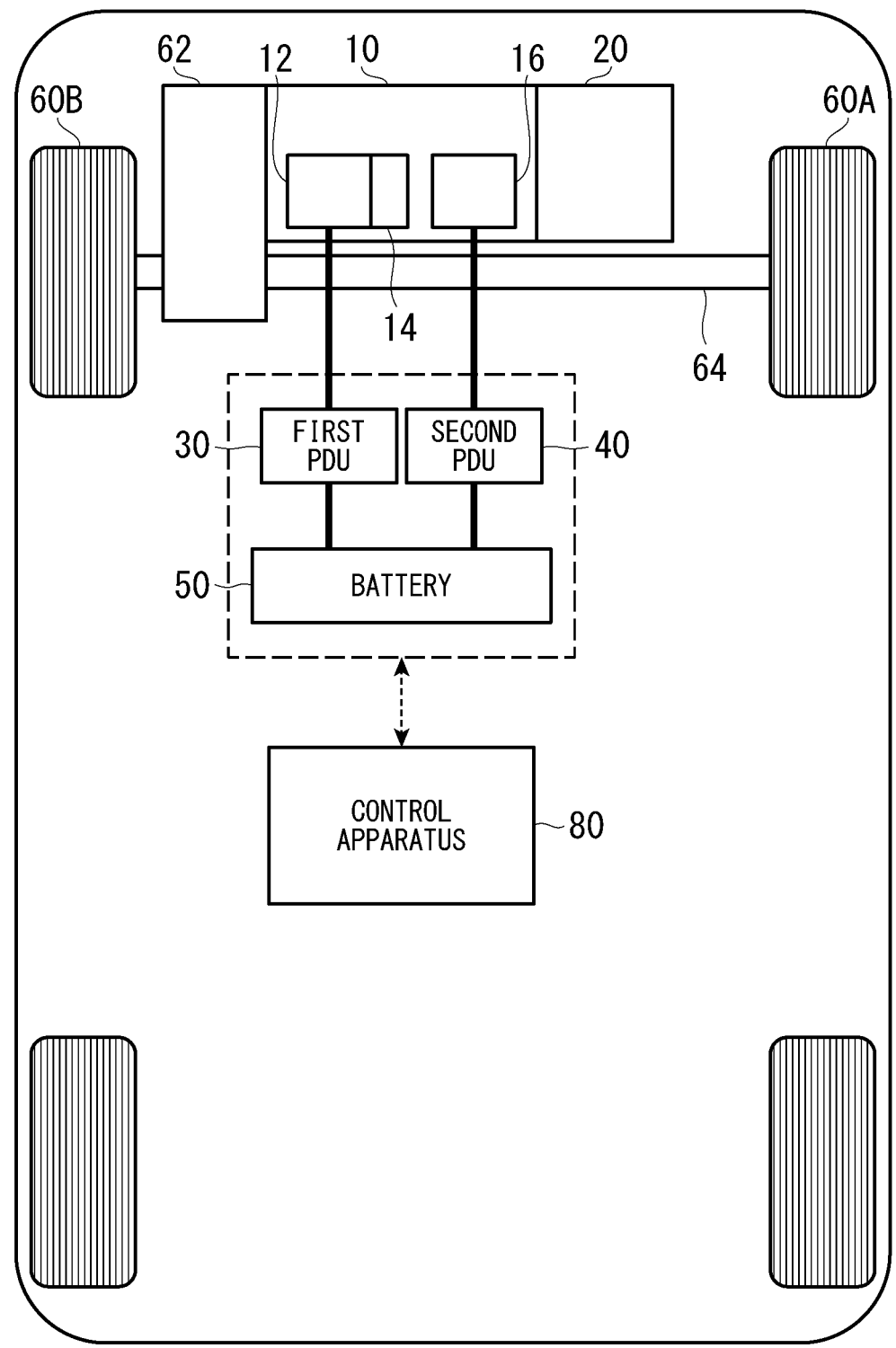
FIG. 1 is a view showing an example of a vehicle according to an embodiment.

FIG. 1 is a view showing an example of a vehicle according to an embodiment. As shown in FIG. 1, the vehicle 1 includes, for example, an electric motor generator 10, an engine 20, a first PDU (Power Drive Unit) 30, a second PDU 40, a battery 50, a drive wheel 60A, a drive wheel 60B, a transmission 62, an axle 64, and a control apparatus 80.

The electric motor generator 10 includes an electric motor 12, a rotation angle sensor 14, and a generator 16.

The electric motor 12 is a power source of the vehicle 1. The electric motor 12 is, for example, a three-phase synchronous electric motor that is driven by an AC current supplied from at least one of the first PDU 30 and the generator 16. The first PDU 30 converts DC electric power supplied from the battery 50 into an AC current using an inverter and supplies the AC current to the electric motor 12. Power generated by the electric motor 12 is transmitted to the axle 64 via the transmission 62. The electric motor 12 functions as a regeneration generator when the vehicle 1 is braked. In this case, the electric motor 12 outputs electric power generated by the function to the battery 50 via the first PDU 30.

The rotation angle sensor 14 measures, for example, a rotation angle of a rotor included in the electric motor 12. The generator 16 generates electric power by rotating in response to power generated by the engine 20. The electric power generated by the generator 16 is supplied to the battery 50 via the second PDU 40.

The generator 16 may be omitted. In this case, instead of the generator 16, the electric motor 12 generates electric power and supplies the electric power to the battery 50.

The engine 20 is a power source of the vehicle 1. Power generated by the engine 20 is transmitted to the axle 64 via the transmission 62. Alternatively, the power generated by the engine 20 is transmitted to the generator 16.

Figure 2:
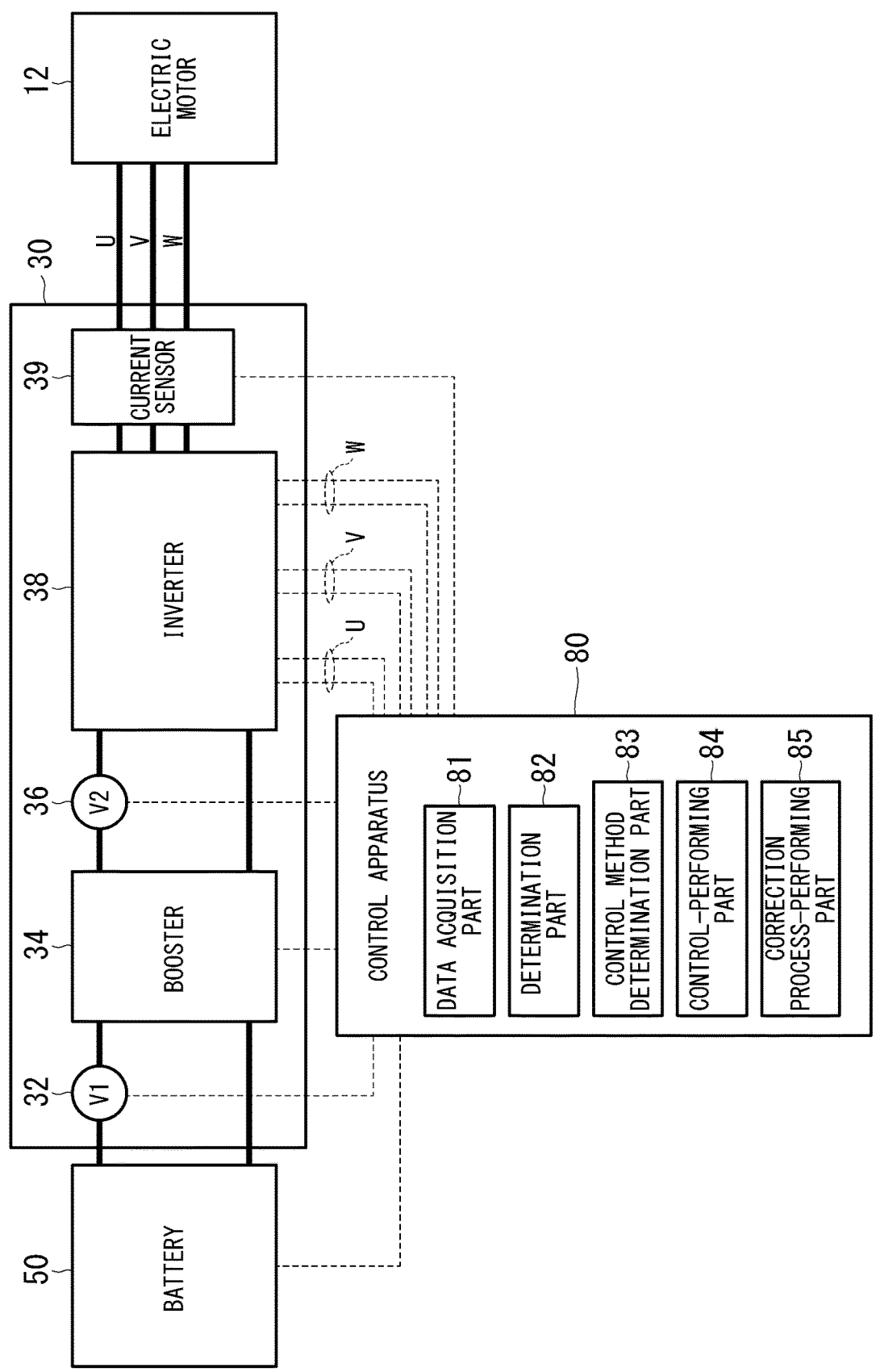
FIG. 2 is a view showing an example of a first PDU, a control apparatus, and a configuration in the vicinity thereof according to the embodiment.

FIG. 2 is a view showing an example of the first PDU, the control apparatus, and a configuration in the vicinity thereof according to the embodiment.

As shown in FIG. 2, the first PDU 30 includes a first voltage sensor 32, a booster 34, a second voltage sensor 36, an inverter 38, and a current sensor 39.

The first voltage sensor 32 is connected between the battery 50 and the booster 34 and detects a voltage of DC electric power that is input to the booster 34. The booster 34 amplifies the voltage and supplies the voltage to the inverter 38. The second voltage sensor 36 detects a DC voltage amplified by the booster 34. The inverter 38 converts the DC electric power that is supplied from the booster 34 into AC electric power and supplies the AC electric power to the electric motor 12. The current sensor 39 detects a current of each of a U-phase, a V-phase, and a W-phase that is supplied to the electric motor 12 and transmits data indicating each of the three currents to the control apparatus 80.

As shown in FIG. 2, the control apparatus 80 includes a data acquisition part 81, a determination part 82, a control method determination part 83, a control-performing part 84, and a correction process-performing part 85.

At least some of functions included in the control apparatus 80 are realized, for example, by a hardware processor such as a CPU (Central Processing Unit) executing a program (software). Some or all of these components may be implemented by hardware (a circuit part including circuitry) such as a LSI (Large-Scale Integration), an ASIC (Application-Specific Integrated Circuit), a FPGA (Field-Programmable Gate Array), or a GPU (Graphics-Processing Unit) or may be implemented by cooperation between software and hardware.

The data acquisition part 81 acquires correction data indicating contents regarding a correction process which corrects an error of an angle at which the rotation angle sensor 14 is attached.

Figure 3:
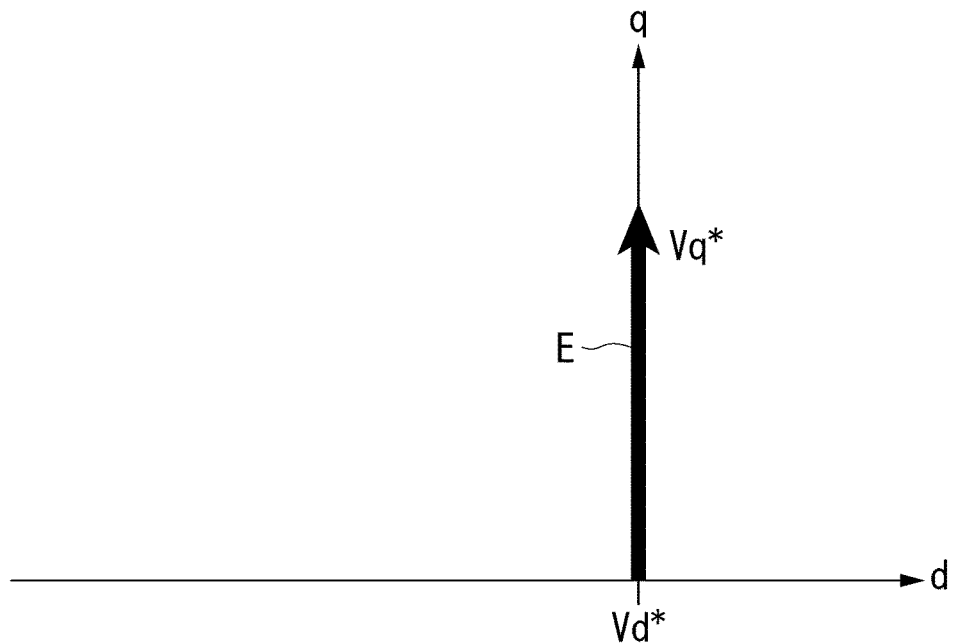
FIG. 3 is a vector view showing an example of a counter electromotive voltage that occurs in a case where an error of an angle at which a rotation angle sensor according to the embodiment is attached is zero.

FIG. 3 is a vector view showing an example of a counter electromotive voltage that occurs in a case where the error of the angle at which the rotation angle sensor according to the embodiment is attached is zero. A d-axis shown in FIG. 3 is an axis that is perpendicular to a rotation axis of the rotor and that is parallel to a direction toward a N pole from a S pole of the rotor. A q-axis shown in FIG. 3 is an axis obtained by rotating the d-axis by 90 degrees in a direction in which the rotor rotates. That is, the d-axis and the q-axis are coordinate axes of a synchronous rotation coordinate of the rotor and rotate together with the rotor.

In the correction process described above, a phase current of a three-phase AC current supplied to the electric motor 12 is made zero. In this case, a counter electromotive voltage represented by a vector E shown in FIG. 3 is generated. When the error of the angle at which the rotation angle sensor 14 is attached is zero, the d-axis recognized by the correction process-performing part 85 matches the d-axis shown in FIG. 3, and the q-axis recognized by the correction process-performing part 85 matches the q-axis shown in FIG. 3. Accordingly, in a case where the error of the angle at which the rotation angle sensor 14 is attached is zero, a d-axis component Vd* of the vector E recognized by the correction process-performing part 85 is represented by following Equation (1), and a q-axis component Vq* of the vector E recognized by the correction process-performing part 85 is represented by following Equation (2). Equation (2) shows that the d-axis component Vd* of the counter electromotive voltage becomes zero in a case where the error of the angle at which the rotation angle sensor 14 is attached is zero.

$$Vd^* = 0 \quad (1)$$

$$Vq^* = E \quad (2)$$

Figure 4:
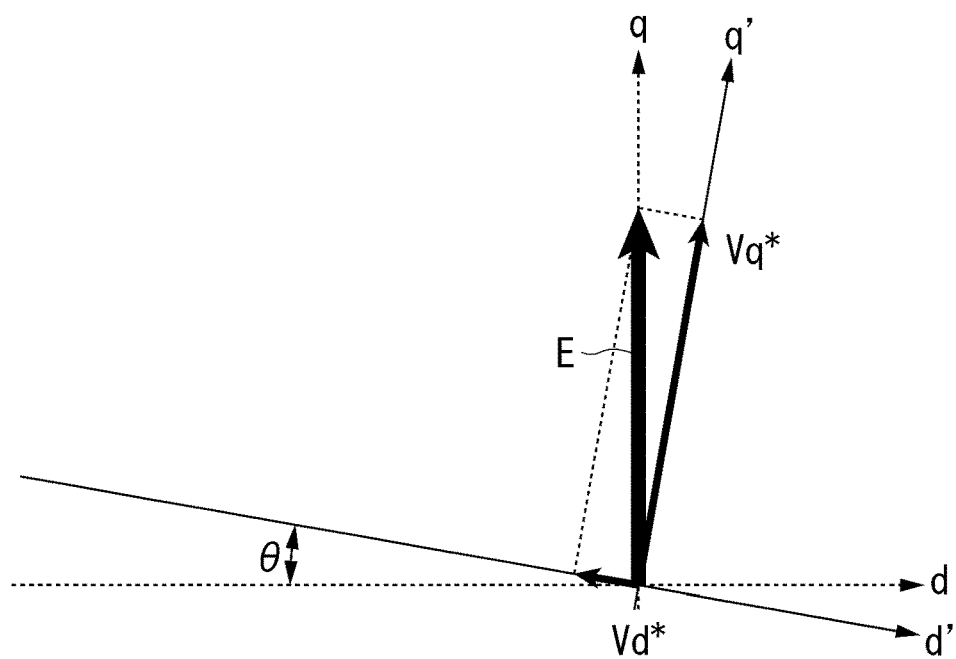
FIG. 4 is a vector view showing an example of a counter electromotive voltage that occurs in a case where the error of the angle at which the rotation angle sensor is attached according to the embodiment is not zero.

FIG. 4 is a vector view showing an example of a counter electromotive voltage that occurs in a case where the error of the angle at which the rotation angle sensor according to the embodiment is attached is not zero. A d-axis shown in FIG. 4 is the same as the d-axis shown in FIG. 3, and a q-axis shown in FIG. 4 is the same as the q-axis shown in FIG. 3. A d'-axis shown in FIG. 4 is a d-axis recognized by the correction process-performing part 85 and is displaced by an error θ of the angle at which the rotation angle sensor 14 is attached from the d-axis shown in FIG. 3. A q'-axis shown in FIG. 4 is a q-axis recognized by the correction process-performing part 85 and is displaced by an error θ of the angle at which the rotation angle sensor 14 is attached from the q-axis shown in FIG. 3.

In the correction process described above, when a phase current of a three-phase AC current supplied to the electric motor 12 is made zero, a counter electromotive voltage represented by a vector E shown in FIG. 4 is generated. When the error of the angle at which the rotation angle sensor 14 is attached is θ, the d-axis recognized by the correction process-performing part 85 becomes the d'-axis shown in FIG. 4, and the q-axis recognized by the correction process-performing part 85 becomes the q'-axis shown in FIG. 4. Accordingly, in a case where the error of the angle at which the rotation angle sensor 14 is attached is θ, a d-axis component Vd* of the vector E recognized by the correction process-performing part 85 is represented by following Equation (3), and a q-axis component Vq* of the vector E recognized by the correction process-performing part 85 is represented by following Equation (4). Equation (4) shows that the d-axis component Vd* of the counter electromotive voltage becomes larger than zero in a case where the error of the angle at which the rotation angle sensor 14 is attached is θ.

$$Vd^* = E \sin \theta \quad (3)$$

$$Vq^* = E \cos \theta \quad (4)$$

From Equation (3) and Equation (4), following Equation (5) that represents the error θ of the angle at which the rotation angle sensor 14 is attached is derived.

$$\theta = \tan^{-1} \frac{E \sin \theta}{E \cos \theta} = \tan^{-1} \frac{Vd^*}{Vq^*} \quad (5)$$

When the phase current of the three-phase AC current supplied to the electric motor 12 is made zero, and in a case where the d-axis component Vd* of the counter electromotive voltage is equal to or less than a predetermined threshold value, the correction process-performing part 85 determines that the correction process has been performed.

On the other hand, in a case where the d-axis component Vd* of the counter electromotive voltage exceeds the predetermined threshold value, the correction process-performing part 85 determines that the correction process has not been performed.

In a case where the correction process has not been performed and it is admitted to perform the correction process, the correction process-performing part 85 performs the correction process. Specifically, the correction process-performing part 85 controls the first PDU 30 such that the phase current of the three-phase AC current supplied to the electric motor 12 becomes zero and controls the first PDU 30 such that the error θ represented by Equation (5) described above becomes small.

In a case where the correction process is performed, the correction process-performing part 85 updates the correction data indicating the contents of the correction process performed so far. Further, the correction process-performing part 85 includes, in the correction data, history data indicating that the correction process has not been performed in a case where the correction process has not been performed and includes, in the correction data, history data indicating that the correction process has been performed in a case where the correction process has been performed. Further, the correction process-performing part 85 includes, in the correction data, error data indicating an error θ estimated on the basis of the d-axis component Vd* of the counter electromotive voltage in a case where the correction process is performed. That is, the data acquisition part 81 may acquire at least one of the history data and the error data included in the correction data. The correction process-performing part 85 writes the correction data, for example, on an EEPROM (Electrically-Erasable Programmable Read-Only Memory) which is one type of non-volatile memories.

The determination part 82 determines whether or not the correction process has been performed on the basis of the correction data.

Specifically, the determination part 82 determines that the correction process has not been performed in a case where the history data indicates that the correction process has not been performed. On the other hand, the determination part 82 determines that the correction process has been performed in a case where the history data indicates that the correction process has been performed.

Alternatively, the determination part 82 determines that the correction process has not been performed in a case where the error indicated by the error data exceeds a predetermined threshold value. On the other hand, the determination part 82 determines that the correction process has been performed in a case where the error indicated by the error data is equal to or less than the predetermined threshold value.

In a case where it is determined that the correction process has not been performed, the control method determination part 83 determines that the inverter 38 which supplies the AC current to the electric motor 12 is controlled under a pulse-width modulation (PWM) control. On the other hand, in a case where it is determined that the correction process has been performed, the control method determination part 83 may determine that the inverter 38 which supplies the AC current to the electric motor 12 is controlled under a one-pulse control.

The pulse-width modulation control is, for example, a sinusoidal pulse-width modulation control and an overmodulation pulse-width modulation control. All of the sinusoidal pulse-width modulation control, the overmodulation pulse-width modulation control, and the one-pulse control are controls that switch between a conduction state and a non-conduction state of a switching element included in the inverter 38.

Figure 5:
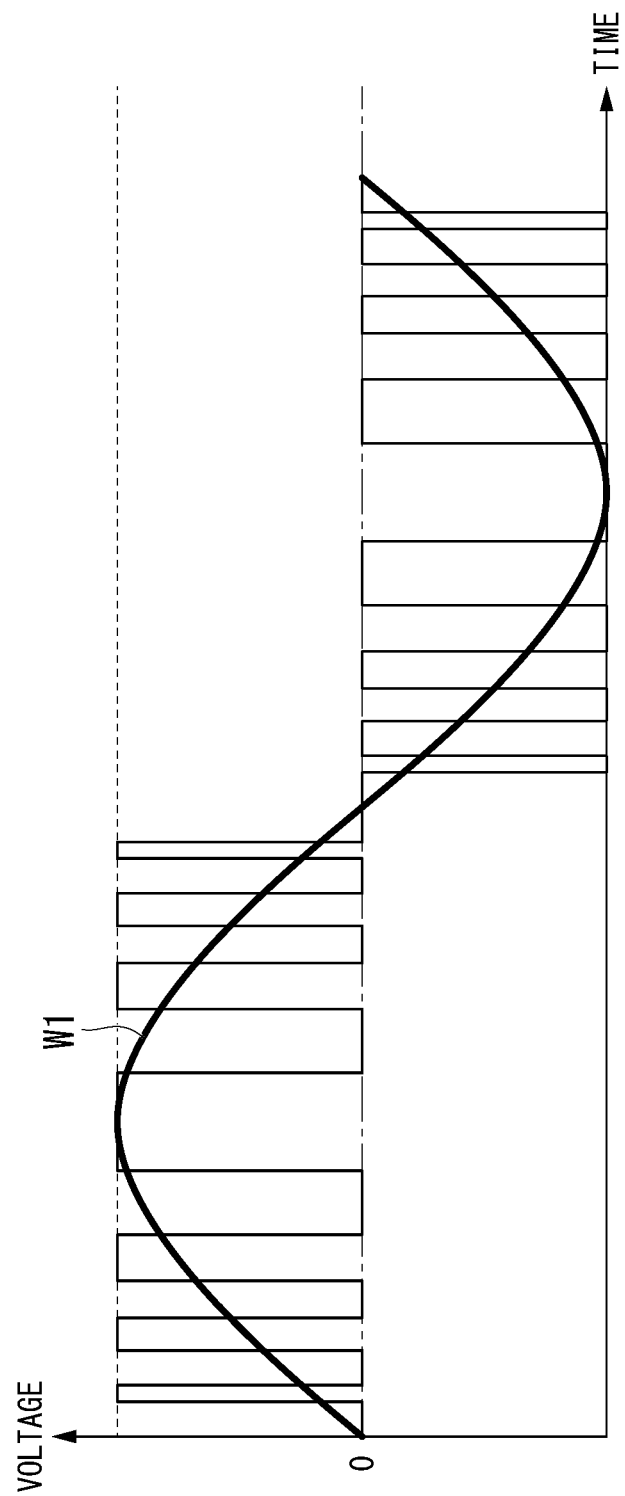
FIG. 5 is a view showing an example of a waveform of a voltage that is output by an inverter according to the embodiment in a case where a sinusoidal pulse-width modulation control is performed.

FIG. 5 is a view showing an example of a waveform of a voltage that is output by the inverter according to the embodiment in a case where the sinusoidal pulse-width modulation control is performed. In FIG. 5, the vertical axis represents a voltage, and the horizontal axis represents time.

The sinusoidal pulse-width modulation control is a control method that supplies an AC voltage equivalent to an AC voltage represented by a sinusoidal wave W1 shown in FIG. 5 to the electric motor 12 by adjusting a duty ratio of a voltage pulse. In the sinusoidal pulse-width modulation control, an amplitude and a phase of the AC voltage are controlled by a feedback control on an AC current supplied to the electric motor 12. The sinusoidal pulse-width modulation control maintains linearity between a voltage and a pulse-width modulation control signal by performing a pulse-width modulation in a state where the amplitude of the AC voltage represented by the sinusoidal wave W1 is equal to or less than an amplitude of a voltage applied between lines of the electric motor 12. Since the sinusoidal pulse-width modulation control is a control that maintains the linearity, the number of times of performing a switching that switches between the conduction state and the non-conduction state of the switching element included in the inverter 38 of the sinusoidal pulse-width modulation control is larger than that of the overmodulation pulse-width modulation control and the one-pulse control.

Figure 6:
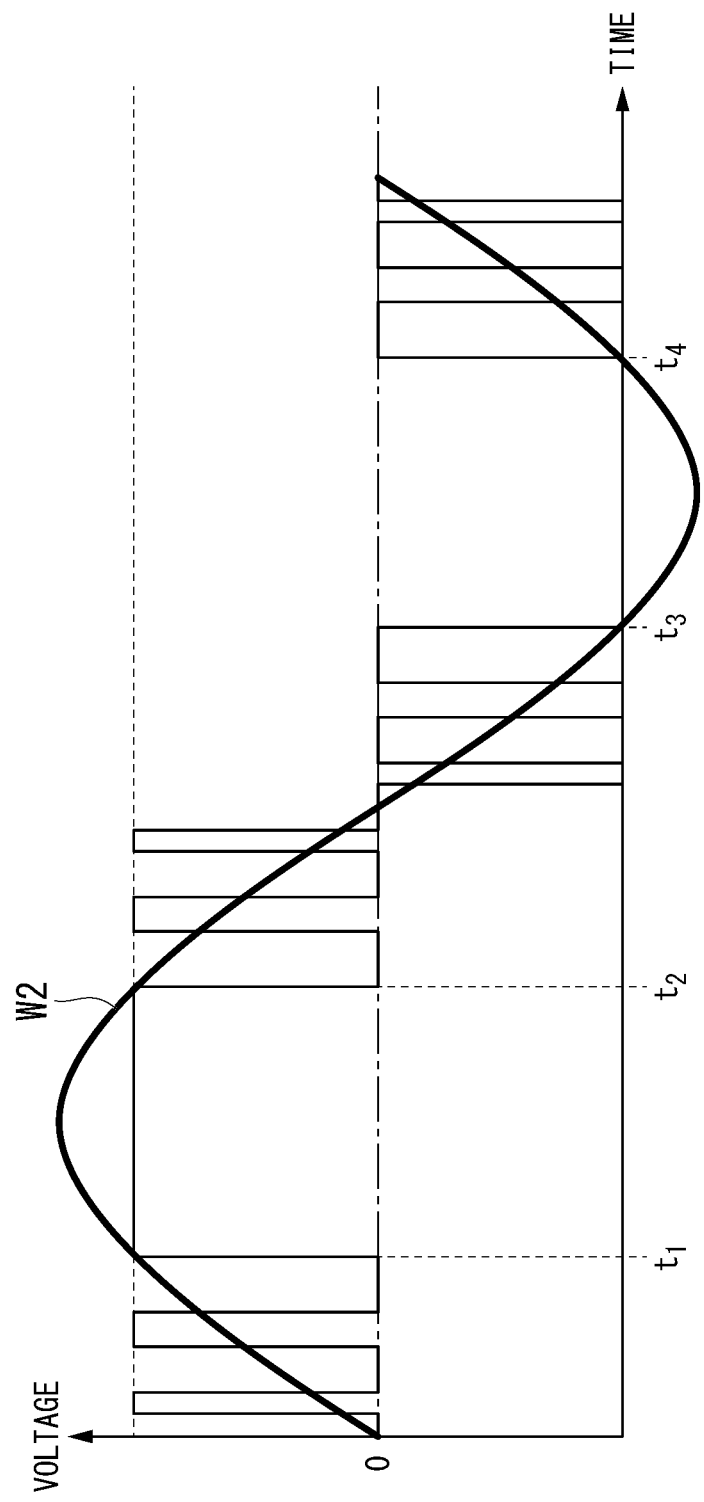
FIG. 6 is a view showing an example of a waveform of a voltage that is output by the inverter according to the embodiment in a case where an overmodulation pulse-width modulation control is performed.

FIG. 6 is a view showing an example of a waveform of a voltage that is output by the inverter according to the embodiment in a case where the overmodulation pulse-width modulation control is performed. In FIG. 6, the vertical axis represents a voltage, and the horizontal axis represents time.

In the overmodulation pulse-width modulation control, an amplitude and a phase of an AC voltage are controlled by a feedback control on an AC current supplied to the electric motor 12. The overmodulation pulse-width modulation control permits non-linearity between a voltage and a pulse-width modulation signal by performing a pulse-width modulation in a state where an amplitude of an AC voltage represented by a sinusoidal wave W2 shown in FIG. 6 is larger than an amplitude of a voltage applied between lines of the electric motor 12. Thereby, the overmodulation pulse-width modulation control distorts a line voltage of the electric motor 12 which is a pseudo sinusoidal wave so as to approach a rectangular waveform and makes it possible to increase a voltage utilization ratio compared to a case in which the line voltage is a pseudo sinusoidal wave.

As shown in FIG. 6, an absolute value of a voltage represented by the sinusoidal wave W2 is larger than an absolute value of an actually applied voltage in a non-linear period from a time $t_1$ to a time $t_2$ and a non-linear period from a time $t_3$ to a time $t_4$. That is, in the two non-linear periods, the line voltage of the electric motor 12 approaches a rectangular waveform from a sinusoidal waveform, and the voltage utilization ratio is increased. Further, since the overmodulation pulse-width modulation control is a control that does not maintain the linearity between the voltage and the pulse-width modulation control signal, the number of times of performing the switching of the overmodulation pulse-width modulation control is less than that of the sinusoidal pulse-width modulation control.

With respect to the pulse-width modulation control, both the sinusoidal pulse-width modulation control and the overmodulation pulse-width modulation control are based on a feedback control on an AC current supplied to the electric motor 12 and do not affect the counter electromotive voltage that is used for the correction process described above. Therefore, the control apparatus 80 can perform the correction process described above in a case where the inverter 38 is subjected to the pulse-width modulation control.

Figure 7:
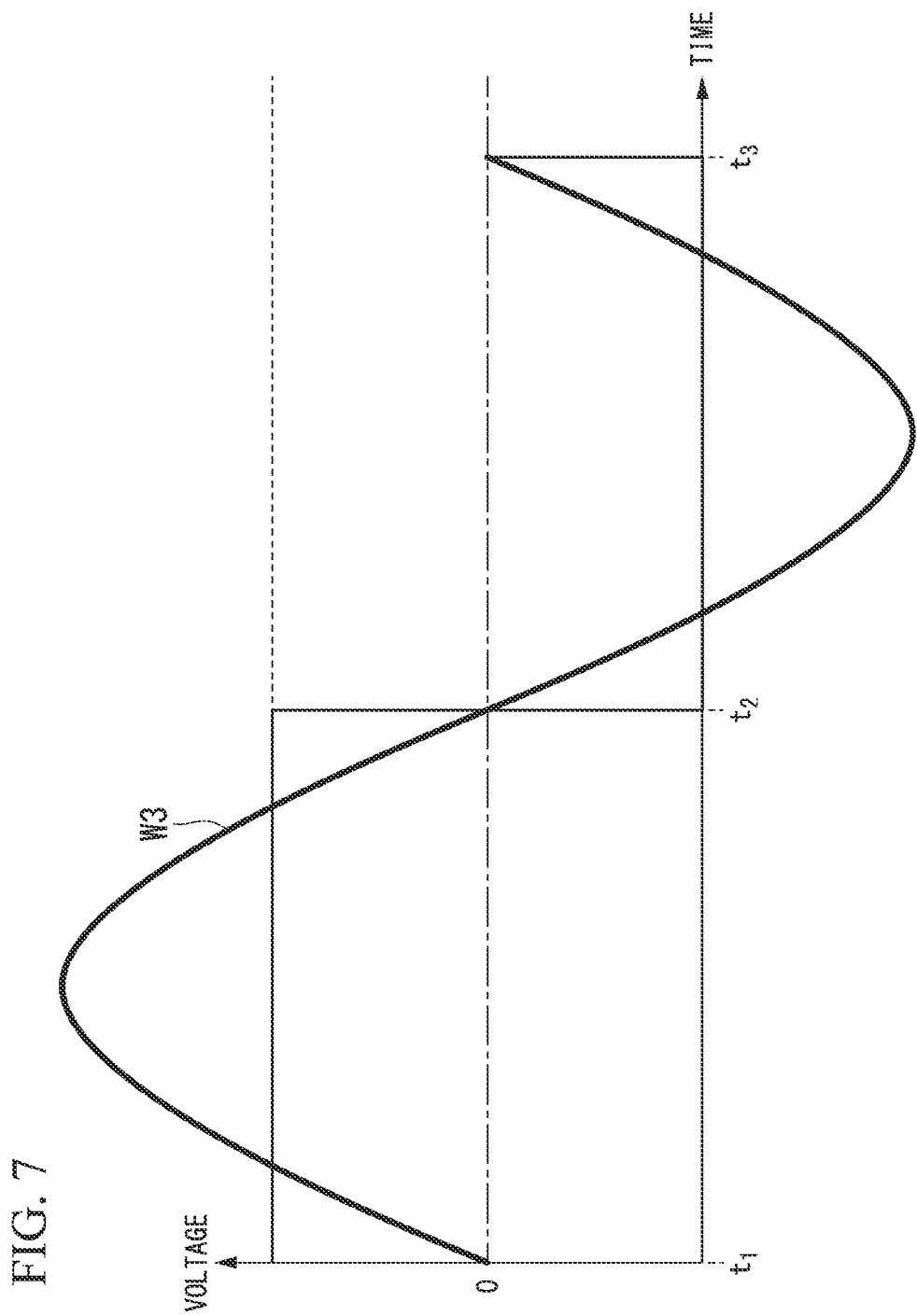
FIG. 7 is a view showing an example of a waveform of a voltage that is output by the inverter according to the embodiment in a case where a one-pulse control is performed.

FIG. 7 is a view showing an example of a waveform of a voltage that is output by the inverter according to the embodiment in a case where the one-pulse control is performed. In FIG. 7, the vertical axis represents a voltage, and the horizontal axis represents time.

The one-pulse control performs switching twice for each one cycle. For example, as shown in FIG. 7, switching is performed at two time points, which are time $t_1$ and time $t_2$, in a period from the time $t_1$ to time $t_3$ that is equal to the cycle of a sinusoidal wave W3. Thereby, in the one-pulse control, an amplitude and a phase of the AC voltage are controlled by a feedback control on an AC voltage supplied to the electric motor 12. When comparing FIG. 6 and FIG. 7, it can be seen that the one-pulse control makes it possible to further increase the voltage utilization ratio compared with the overmodulation pulse-width modulation control. Further, the one-pulse control has a smaller number of times of performing switching than the overmodulation pulse-width modulation control.

The one-pulse control is based on a feedback control on an AC voltage supplied to the electric motor 12 and affects the counter electromotive voltage that is used for the correction process described above. Therefore, the control apparatus 80 cannot perform the correction process described above in a case where the inverter 38 is subjected to the one-pulse control.

The control-performing part 84 performs the pulse-width modulated control or the one-pulse control in accordance with a determination by the control method determination part 83.

Figure 8:
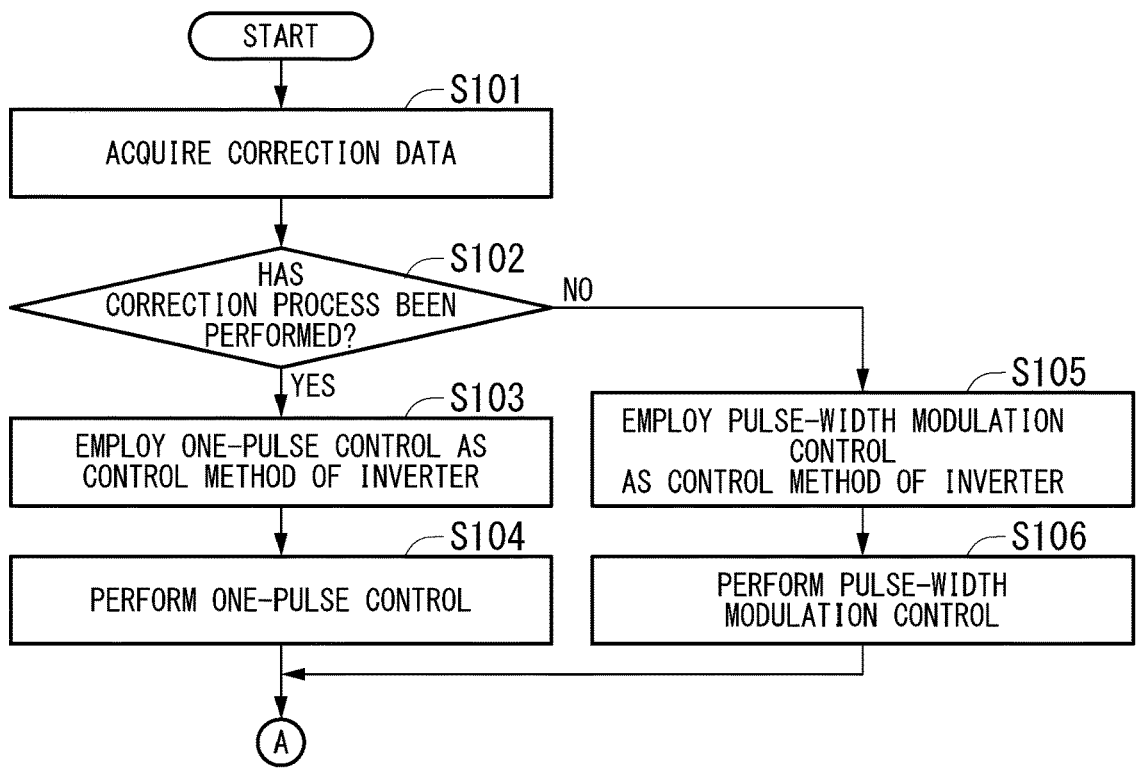
FIG. 8 is a flowchart showing an example of a process performed by the control apparatus according to the embodiment.
Figure 9:
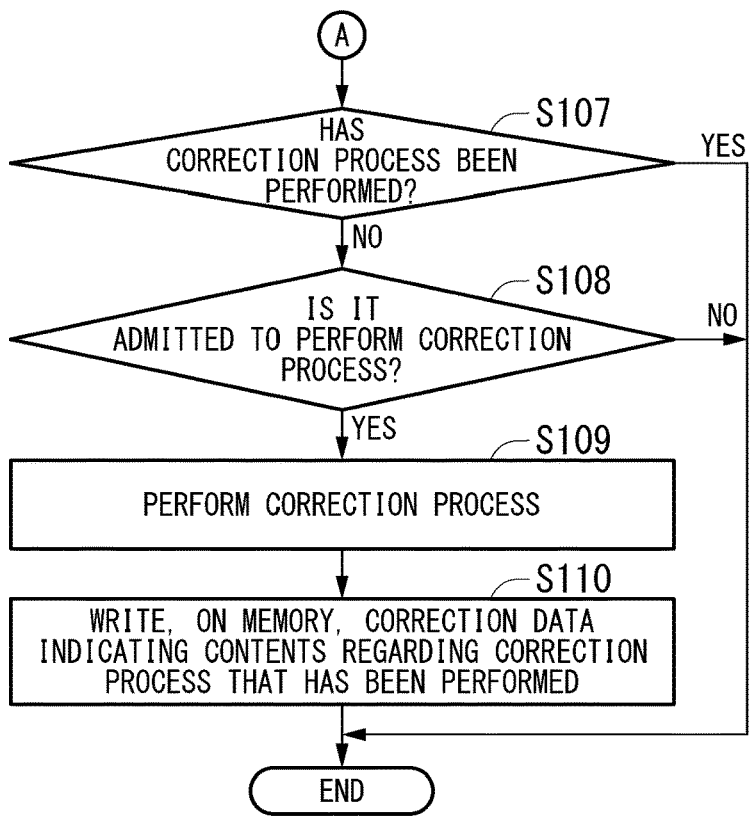
FIG. 9 is a flowchart showing an example of a process performed by the control apparatus according to the embodiment.

Next, a process performed by the control apparatus 80 according to the embodiment is described with reference to FIG. 8 and FIG. 9. FIG. 8 and FIG. 9 are flowcharts showing an example of the process performed by the control apparatus according to the embodiment. The control apparatus 80 may perform the process shown in FIG. 8 and FIG. 9 at an arbitrary timing.

In Step S101, the data acquisition part 81 acquires correction data.

In Step S102, the determination part 82 determines whether or not the correction process has been performed. In a case where it is determined that the correction process has been performed on the basis of the correction data (Step S102: YES), the determination part 82 advances the process to Step S103. On the other hand, in a case where it is determined that the correction process has not been performed on the basis of the correction data (Step S102: NO), the determination part 82 advances the process to Step S105.

In Step S103, the control method determination part 83 employs the one-pulse control as the control method of the inverter 38.

In Step S104, the control-performing part 84 performs the one-pulse control.

In Step S105, the control method determination part 83 employs the pulse-width modulation control as the control method of the inverter 38.

In Step S106, the control-performing part 84 performs the pulse-width modulation control.

In Step S107, the correction process-performing part 85 determines whether or not the correction process has been performed. In a case where it is determined that the correction process has been performed (Step S107: YES), the correction process-performing part 85 terminates the process. On the other hand, in a case where it is determined that the correction process has not been performed (Step S107: NO), the correction process-performing part 85 advances the process to Step S108.

In Step S108, the correction process-performing part 85 determines whether or not it is admitted to perform the correction process. In a case where it is determined that it is admitted to perform the correction process (Step S108: YES), the correction process-performing part 85 advances the process to Step S109. On the other hand, in a case where it is determined that it is not admitted to perform the correction process (Step S108: NO), the correction process-performing part 85 terminates the process.

In Step S109, the correction process-performing part 85 performs the correction process.

In Step S110, the correction process-performing part 85 writes, on a memory, correction data indicating the contents regarding the correction process that has been performed.

Hereinbefore, the control apparatus according to the embodiment has been described. The control apparatus 80 determines that the inverter 38 which supplies an AC current to the electric motor 12 is controlled under the pulse-width modulation control in a case where it is determined that the correction process has not been performed on the basis of the correction data. Thereby, the control apparatus 80 performs the correction process under the pulse-width modulation control, which is a control method capable of performing the correction process, and reduces a difference between a drive torque of the electric motor 12 in a case where the pulse-width modulation control is performed and a drive torque of the electric motor 12 in a case where the one-pulse control is performed. Accordingly, it is possible for the control apparatus 80 to reduce vibration of a vehicle body due to a sudden change of the drive torque of the electric motor 12.

Further, the control apparatus 80 determines that the correction process has not been performed in a case where the history data indicates that the correction process has not been performed. Thereby, the control apparatus 80 can further reliably determine that the correction process has not been performed on the basis of the past history.

Further, the control apparatus 80 determines that the correction process has not been performed in a case where the error indicated by the error data exceeds the predetermined threshold value. Thereby, since the control apparatus 80 can estimate whether or not the correction process has been performed on the basis of the magnitude of the error of the angle at which the rotation angle sensor is attached, it is possible to omit a process of confirming the past history.

Although an embodiment of the present invention has been described with reference to the drawings, the present invention is not limited in to the embodiment described above, and various modifications and substitutions can be made without departing from the scope of the present invention.

What is claimed is:

1. A control apparatus, comprising:
a processor configured to execute a program to:
acquire correction data indicating a content regarding a correction process which corrects an error of an angle at which a rotation angle sensor that measures a rotation angle of a rotor included in an electric motor is attached;
determine, based on the correction data, whether or not the correction process has been performed;
determine, in a case where it is determined that the correction process has not been performed, that an inverter which supplies an AC current to the electric motor is controlled under a pulse-width modulation control and determine, in a case where it is determined that the correction process has been performed, that the inverter which supplies the AC current to the electric motor is controlled under one-pulse control; and
perform the correction process after it is determined to control the inverter with the pulse-width modulation control when it is determined that the correction process has not been performed and make a storage to store correction data indicating that the correction process has been performed,
wherein, to determine whether or not the correction process has been performed, the processor is further configured to execute the program to determine that the correction process is not necessary when a phase current of a three-phase AC current supplied to the electric motor is made zero and in a case where a direction of a vector of a d-axis component of a counter electromotive voltage is equal to or less than a predetermined threshold value with respect to a reference and to determine that the correction process is necessary in a case where the direction of the vector exceeds the predetermined threshold value with respect to the reference.

2. The control apparatus according to claim 1, wherein the processor is further configured to execute the program to:
acquire the correction data which includes history data indicating whether or not the correction process has been performed, and
determine that the correction process has not been performed in a case where the history data indicates that the correction process has not been performed.

3. The control apparatus according to claim 1, wherein the processor is further configured to execute the program to:
acquire the correction data which includes error data indicating the error, and determine that the correction process has not been performed in a case where the error indicated by the error data exceeds the predetermined threshold value.

4. A vehicle system, comprising:

a processor configured to execute a program to:

acquire correction data indicating a content regarding a correction process which corrects an error of an angle at which a rotation angle sensor that measures a rotation angle of a rotor included in an electric motor is attached;

determine, based on the correction data, whether or not the correction process has been performed;

determine, in a case where it is determined that the correction process has not been performed, that an inverter which supplies an AC current to the electric motor is controlled under a pulse-width modulation control and determine, in a case where it is determined that the correction process has been performed, that the inverter which supplies the AC current to the electric motor is controlled under one-pulse control; and perform the correction process after it is determined to control the inverter with the pulse-width modulation control when it is determined that the correction process has not been performed and that makes a storage to store correction data indicating that the correction process has been performed, wherein, to determine whether or not the correction process has been performed, the processor is further configured to execute the program to determine that the correction process is not necessary when a phase current of a three-phase AC current supplied to the electric motor is made zero and in a case where a direction of a vector of a d-axis component of a counter electromotive voltage is equal to or less than a predetermined threshold value with respect to a reference and to determine that the correction process is necessary in a case where the direction of the vector exceeds the predetermined threshold value with respect to the reference.

* * * * *